(12) United States Patent
Warren

(10) Patent No.: US 7,393,583 B1
(45) Date of Patent: Jul. 1, 2008

(54) FLOORING TILE

(75) Inventor: Christopher Warren, Baltimore, MD (US)

(73) Assignee: Starquartz Industries, Inc., Baltimore, MD (US)

( * ) Notice: Subject to any disclaimer, the term of this patent is extended or adjusted under 35 U.S.C. 154(b) by 340 days.

(21) Appl. No.: 10/823,516

(22) Filed: Apr. 13, 2004

Related U.S. Application Data

(60) Provisional application No. 60/462,392, filed on Apr. 14, 2003.

(51) Int. Cl.
*B32B 5/16* (2006.01)

(52) U.S. Cl. .................................................. 428/327

(58) Field of Classification Search .......... 428/44, 428/414, 423.1, 524, 327, 331, 332; 404/17, 404/34, 44; 506/1; 796/1
See application file for complete search history.

(56) References Cited

U.S. PATENT DOCUMENTS

| | | | | |
|---|---|---|---|---|
| 3,801,421 A | * | 4/1974 | Allen et al. .................... 428/17 |
| 3,928,706 A | * | 12/1975 | Gibbons ...................... 428/323 |
| 4,059,853 A | * | 11/1977 | Girdler ........................ 24/66.4 |
| 4,265,957 A | * | 5/1981 | Severance et al. ............ 428/143 |
| 4,267,221 A | * | 5/1981 | Ishikawa ...................... 428/121 |
| 4,356,037 A | * | 10/1982 | Novak ......................... 428/325 |
| 4,373,992 A | * | 2/1983 | Bondoc ....................... 162/145 |
| 4,504,523 A | * | 3/1985 | Miller et al. ................. 427/197 |
| 4,525,965 A | * | 7/1985 | Woelfel .................... 52/309.17 |
| 4,567,704 A | | 2/1986 | Bernett |
| 4,701,481 A | * | 10/1987 | Bogan et al. ................. 523/428 |
| 4,781,987 A | * | 11/1988 | Bolgiano et al. .......... 428/424.6 |
| 4,791,015 A | * | 12/1988 | Becker et al. ................ 428/156 |
| 4,910,936 A | | 3/1990 | Abendroth |
| 4,945,697 A | * | 8/1990 | Ott et al. ..................... 52/403.1 |
| 5,183,438 A | * | 2/1993 | Blom ........................... 472/92 |
| 5,255,482 A | | 10/1993 | Whitacre |
| 5,411,352 A | * | 5/1995 | Eren ............................ 404/31 |
| 5,595,625 A | | 1/1997 | Fishel |
| 5,682,724 A | | 11/1997 | Randjelovic |
| 6,228,463 B1 | * | 5/2001 | Chen et al. .................. 428/160 |
| 6,397,543 B1 | | 6/2002 | Hamar |
| 6,399,181 B1 | * | 6/2002 | Corder ........................ 428/143 |
| 2002/0090490 A1 | * | 7/2002 | Kawasumi et al. ........... 428/113 |
| 2003/0156901 A1 | * | 8/2003 | Britt et al. ..................... 404/17 |

FOREIGN PATENT DOCUMENTS

| | | | |
|---|---|---|---|
| DE | 2426521 A1 | * 12/1975 | |
| WO | WO 00/50707 | * 11/1999 | ........................ 15/2 |

* cited by examiner

*Primary Examiner*—Brian Glessner
*Assistant Examiner*—Adriana Figueroa
(74) *Attorney, Agent, or Firm*—Jansson Shupe & Munger Ltd.

(57) ABSTRACT

A multi-layer flooring tile having a porous base layer of rounded silica particles, supporting a resilient and stretchable flexible membrane layer which supports a top layer of aliphatic polymer, fine filler and quartz mineral. The top layer is coated with a clear polymer coating. The flexible membrane layer is formed directly on the base layer, forming a bond without adhesive and likewise the top layer is formed on the flexible membrane layer, bonding without adhesive as the layers cure simultaneously. The flooring tiles are to be installed in the manner of an ordinary tile floor and provide a multi-layer, chemical resistant, non-slip flooring system.

17 Claims, 2 Drawing Sheets

FLOORING TILE

REFERENCE TO RELATED APPLICATIONS

The applicant claims priority of this application based on the provisional application No. 60/462,392, for Flooring Tile, filed 14 Apr. 2003.

NON-PUBLICATION

The applicant requests, pursuant to 35 USC 122(b)(2)(B)(i) that this application not be published.

BACKGROUND

In the field of commercial and industrial flooring, there is a need for flooring material which is wear resistant and also resistant to penetration and staining or loss of color from contact with petroleum and other chemicals. Hard surface materials, such as ceramic tile, have been widely used for commercial and industrial flooring. Ceramic tiles retain their color, resist staining and can be produced with a textured surface to reduce slipping. The ceramic tile flooring is often installed over a concrete or stone substrate. A problem with ceramic tile flooring is that the flooring will not flex and may break when an impact is received from an object, which has, for example, been inadvertently dropped on the flooring.

This problem has been addressed by adding a rubbery layer on the concrete base beneath the tile, see U.S. Pat. No. 4,567,704 to Bernett. The rubbery layer provides some degree of resiliency to the floor and reduces the tendency of tiles to break upon receiving an impact while the hard surface of the ceramic tile provides the desired appearance and durability. The rubbery layer is also stretchable and prevents shifting and cracking of the substrate from propagating to the tile.

This type of multi-layer flooring system disadvantageously requires that the layers be bonded together at the job site. Typical installation involves the use of an epoxy adhesive with the flooring system being applied in layers at the site. The top layer may be ceramic tile or an epoxy-based material which cures after being applied. The installation process is more difficult and time consuming than the installation of a floor consisting of modular tiles which require only the application of adhesive, setting of the tiles and perhaps, grouting. The multiple layers are necessary to provide the protection from cracking of the tiles due to impact and due to shifting of the concrete or stone substrate.

Multi-layer flooring systems with an epoxy-based top layer also suffer from blistering and delamination of the layers produced by hydrostatic water pressure. Such pressure occurs when moisture rises through the concrete or stone substrate and cannot dissipate laterally through the epoxy adhesive. Multi-layer flooring systems with a ceramic tile top layer may also have tiles loosened or broken from hydrostatic water pressure.

There is a need for a multi-layer floor system, in the form of a plurality of color fast textured surface modular tiles, said tiles including a base layer capable of dissipating moisture to greatly reduce hydrostatic pressure, a flexible membrane layer which is stretchable and resilient and a top layer providing a surface with a hardness and durability comparable to ceramic tile, and there is a need for such a multi-layer floor system which can be easily installed in the manner of an ordinary tile floor.

SUMMARY OF THE INVENTION

It is an object of the current invention to provide a multi-layer flooring tile which can be installed using ordinary cementitious adhesive.

It is a further object of the invention to provide a flooring tile with a top layer having hardness, durability and stain resistance comparable with, or exceeding that, of ceramic tile or an epoxy-based material, a flexible membrane layer providing resiliency and stretchability and a porous base layer capable of dissipating moisture laterally throughout the base.

It is another object of the invention to provide a flooring tile having an abrasive surface and permanent color.

The present invention is a multi-layer flooring tile. It is intended that a plurality of the flooring tiles be installed in side by side relationship to form a flooring system. Each tile has a colored quartz particle composition top layer which provides a hard, durable chemical resistant surface. The quartz particles, at the surface, also provide an abrasive texture. Each tile has a resilient and stretchable flexible membrane layer, which protects the tile from breakage when an impact is received. The flexible membrane also stretches when subjected to movement from below; thereby reducing the tendency of the top layer to crack, due to said movement. Each tile has a porous and firm flat bottomed base layer which supports the top layer and allows moisture to dissipate throughout the base layer.

It is intended that the tiles be installed on a concrete or stone substrate forming the floor of a commercial or industrial building. A cementitious adhesive is recommended for bonding the tiles to the substrate. A cementitious grout is recommended to provide a strong adhesive bond between tiles and to allow additional flexibility of lateral movement due to shifting and cracking of the substrate. The cementitious adhesive and grout are porous and will not inhibit the capacity of the base layer to dissipate moisture thereby relieving hydrostatic pressure.

DETAILED DESCRIPTION OF THE PREFERRED EMBODIMENT

Figure 1:
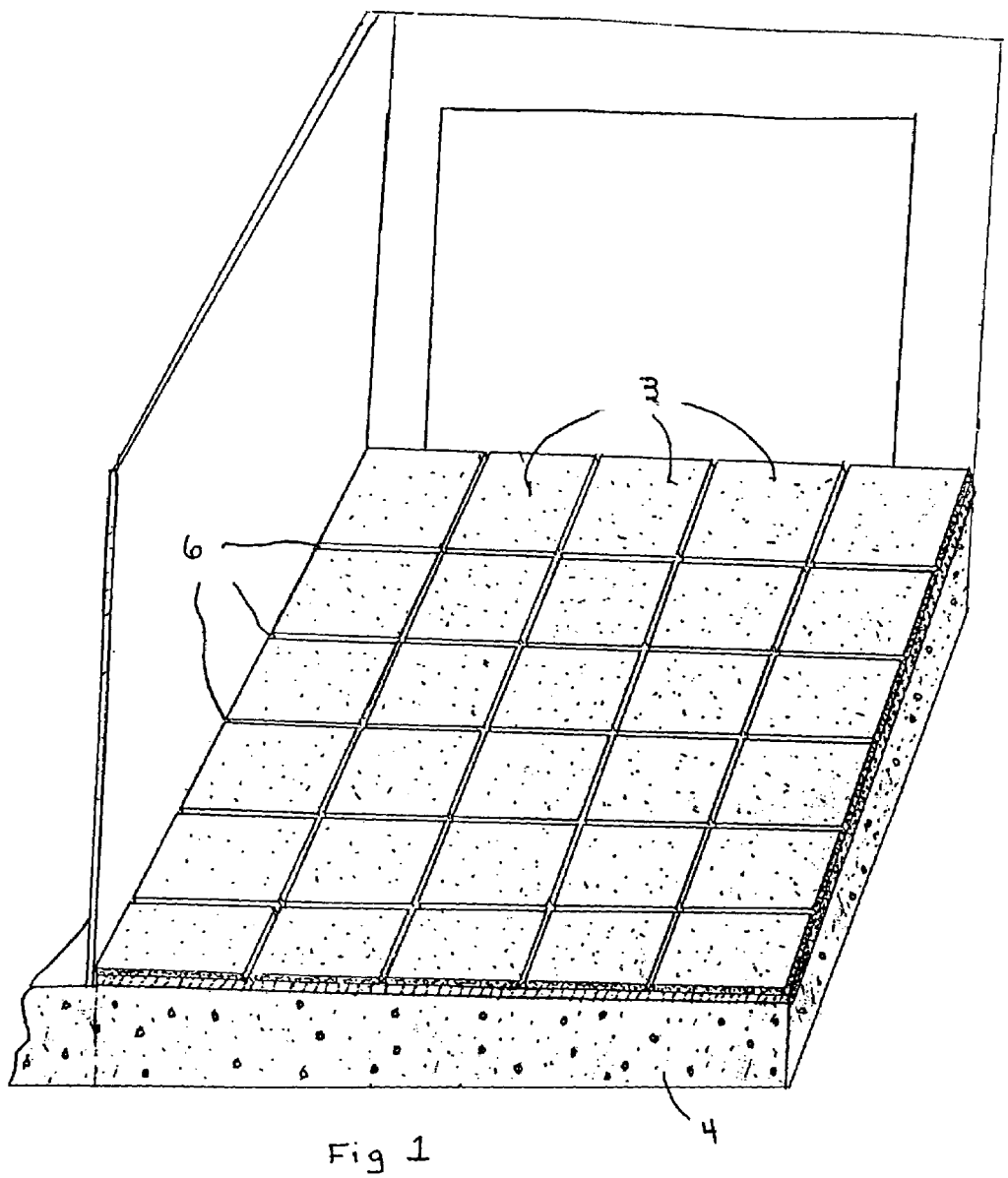
FIG. 1 is a perspective view of a floor comprised of multiple flooring tiles of the present invention.
Figure 2:
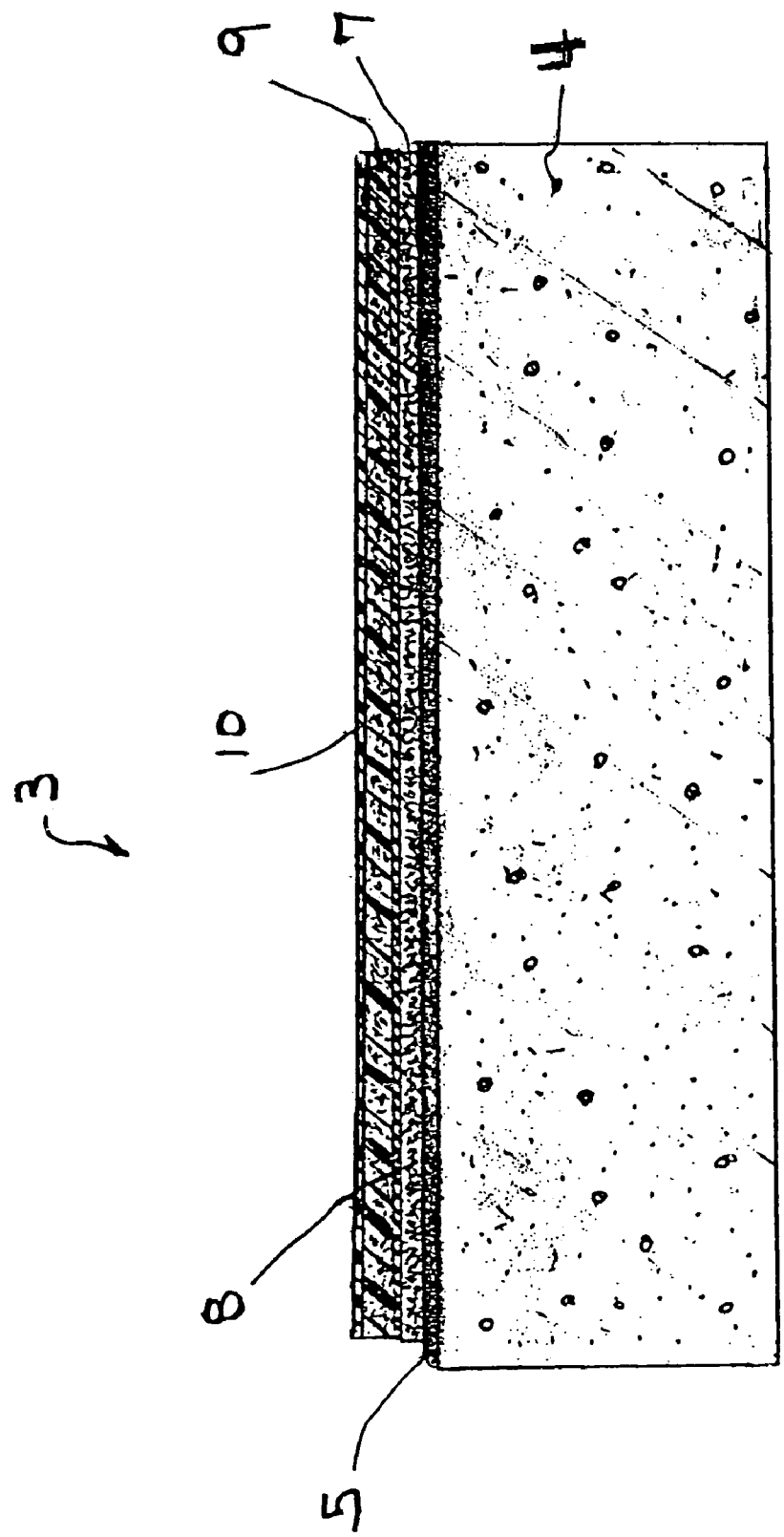
FIG. 2 is a side elevation view of a flooring tile of the present invention on a substrate.

One embodiment of the present invention is a multi-layer flooring tile intended to form a flooring system using a plurality of the flooring tiles 3 of the present invention installed in side by side relationship and covering the area to be floored, as shown in FIG. 1. The flooring tile 3, as shown in FIG. 2, comprises a base layer 7, a flexible membrane layer 8 and a top layer 9. As also shown in FIG. 2, the flooring tile 3 is affixed to a concrete substrate 4 by cementitious adhesive 5.

The base layer 7 is formed of silica sand particles, the size of which is approximately 60 mesh. It is preferred that the silica sand particles be pre-coated with a heat activated phenolic resin. A suitable product is resin coated sand, available from Borden Chemicals Co. The product is offered with varying percentages of resin and a ratio of approximately 3 to 5% resin, by weight, to sand is preferred. The base is formed by heating the pre-coated silica sand to approximately 425 degrees Fahrenheit, in a flat bottomed mold and maintaining the temperature for a minimum of 45 seconds. The temperature is selected so as to allow the coating of the particles to lose moisture and fuse to one another but not so high as to melt the coating. The heat causes the silica particles, which are of a generally round shape, to fuse together at points of contact forming a solid lattice structure, with communicating interstitial pores. The base layer is allowed to cool and the phenolic resin hardens to form a water resistant coating.

The flexible membrane layer 8 consists of an aliphatic polymer, such as epoxy, mixed with 60 mesh rubber particles or flexible additives and cured by an amine-based catalyst. The mixture is applied, in liquid form, to the base layer 7 in a thickness of approximately 20-30 mils. A suitable epoxy is Dow Chemicals, DER-324®, cured with Air Products, Acamine 2143®, catalyst in a ratio of two parts epoxy to one part catalyst. Approximately two to three drops of wetting agent, such as Ease-Tech Chemicals Co., Multi-Flow® are added. The rubber particles are added to the catalyzed epoxy in a ratio of 245% rubber particles to catalyzed epoxy, by weight. Rubber particles are available from Midwest Elastomers Inc. as ME6-EPDM®, a 60 mesh product comprised of pulverized scrap rubber. In place of the rubber particles, a flexibilizer such as Eastech Chemicals Co. DER 736®, can be used in a ratio of 20% by weight but it yields a lesser volume of material for forming the flexible membrane layer 8.

The top layer 9 consists of aliphatic polymer, such as epoxy, which may be clear or pigmented. The same epoxy and catalyst used in the flexible membrane layer 8, may be used in the top layer 9. Silica sand of fine grade and silica flour are added to the catalyzed epoxy in a ratio of approximately 18 pounds silica sand and 13.5 pounds silica flour to 18 pounds catalyzed epoxy and thoroughly mixed. The top layer 9 is immediately formed directly on the flexible membrane layer 8, before the flexible membrane layer 8 has cured. The top layer 9 mixture is applied to the flexible membrane layer 8 in a thickness of approximately 40-60 mils and is allowed to self-level. The silica sand settles toward the bottom of the top layer 9. The mixture is broadcasted with 28 mesh colored round quartz mineral to rejection, so that the surface is evenly covered. The rejected quartz mineral is removed. The top layer 9 and the flexible membrane layer 8 are allowed to cure simultaneously. After curing, the top layer 9 is finished with a clear aliphatic polymer coating 10 consisting of 10-20 mils of a two component polyaspartic or urethane coat, applied with a rubber squeegee. The aliphatic polymer for the top layer 9 and the polyaspartic or urethane for the clear aliphatic polymer coating 10 are preferably selected to have high ultraviolet light resistant properties.

The flooring tile 3, of the present invention, is a multi-layer floor covering having a flat bottomed base layer 7, a stretchable and resilient flexible membrane layer 8, an aliphatic polymer and quartz top layer 9 and a clear aliphatic polymer coating 10. The flooring tile 3 incorporates the impact and crack resistance of a flooring system backed with a flexible membrane, the appearance and durability of a hard surface floor and the capability of dissipating moisture below; all in a modular tile which can be installed by cementing and grouting in the same manner as an ordinary tile floor.

The base layer 7 is a solid and porous material formed by the lattice of fused rounded silica particles, with communicating interstitial spaces. Moisture, which permeates through the concrete substrate 4 and into the base layer 7, dissipates freely throughout the interstitial spaces between the silica particles. Areas of high hydrostatic pressure, which tend to blister or crack flooring material, are avoided. The solid and porous nature of the base layer 7 avoids the need for channels or pilings, to dissipate moisture and allows the whole surface of the base layer 7 to contact and support the flooring tile 3. The pre-coating of the silica particles is a water resistant material, which protects the silica particles from deterioration due to exposure to moisture. The flexible membrane layer 8 is applied to the base layer 7, in liquid form, so that it bonds without adhesive. The porous nature of the base layer 7 promotes firm bonding. The bond is less susceptible to delamination when exposed to moisture.

The flexible membrane layer 8 provides resilient support for the top layer 9, to reduce the tendency of the tile to crack upon receiving an impact. The flexible membrane layer 8 of the preferred embodiment has a durometer of approximately 50 Shore A. The flexible membrane layer 8 also stretches in response to cracking and shifting of the base layer 7 to prevent propagation of cracks to the top layer 9. The flexible membrane layer of the preferred embodiment allows approximately 200-400% elongation. The top layer 9 is applied to the flexible membrane layer 8 while the flexible membrane layer 8 remains in liquid form, allowing the two layers to bond without adhesive.

The top layer 9 provides a hard surface capable of resisting compressive loads in the range of 13,000-20,000 pounds per square inch. The colored quartz provides a permanent wear resistant color. The polymer coating 10 remains clear and protects the tile from deterioration from contact with chemicals. The quartz mineral particles provide an abrasive surface which reduces slipping. The base layer 7, the flexible membrane layer 8, the top layer 9 and the polymer coating 10 are firmly bonded without adhesive and are not subject to delamination.

It is intended that the flooring tiles 3 be affixed to a substrate by a cementitious adhesive 5, as shown in FIG. 2 and that the floor be finished with a cementitious grout 6, as shown in FIG. 1. The cementitious products will not inhibit the capacity of the base layer 7 to dissipate moisture. The absence of channels or pilings on the base layer 7 allow uninterrupted contact with the cementitious adhesive 5, providing a solid bond and uniform support from the substrate to the top layer 9. Having described, in detail, the flooring tile 3 of the present invention and the process of making it, the reader will understand that variations and equivalents may be substituted for elements and steps described herein without departing from the spirit of the invention.

I claim:

1. A material for use in making tile products comprising:
    a first layer including silica sand particles pre-coated with phenolic resin forming a layer having fused-together particles with pores between the particles;
    a second layer overlying the first layer, said second layer including an aliphatic polymer and a resilient material; and
    a third layer overlying the second layer, said third layer including an aliphatic polymer, silica sand and silica flour.

2. The material of claim 1 wherein the silica sand of the first layer has a particle size of about 60 mesh.

3. The material of claim 1 wherein the phenolic resin is present in an amount of about 3 to 5 percent by weight of the silica sand of the first layer.

4. The material of claim 1 wherein the second layer further comprises a catalyst.

5. The material of claim 1 wherein the aliphatic material of the second layer comprises an epoxy.

6. The material of claim 5 wherein the resilient material of the second layer comprises one of an elastomer and a flexibilizer.

7. The material of claim 6 wherein the elastomer comprises rubber.

8. The material of claim 7 wherein the rubber comprises rubber particles having a particle size of about 60 mesh.

9. The material of claim 1 wherein the second layer has a thickness of about 20-30 mils.

10. The material of claim 1 wherein the aliphatic material of the third layer comprises an epoxy.

11. The material of claim 1 wherein the third layer further comprises colored quartz particles distributed therein.

12. The material of claim 11 wherein the colored quartz particles have a particle size of about 28 mesh.

13. The material of claim 1 wherein the third layer has a thickness of about 40-60 mils.

14. The material of claim 1 further comprising a fourth layer overlying the third layer, said fourth layer including a clear aliphatic polymer.

15. A laminate material for use in the production of tiles comprising:
- a base layer including silica sand particles pre-coated with phenolic resin, said first layer including fused-together particles with interstitial spaces between the particles;
- a second layer bonded to the base layer, said second layer including an epoxy resin and elastomeric particles; and
- a third layer overlying the second layer, said third layer including an epoxy resin, silica sand and silica flour.

16. The material of claim 15 wherein the third layer further comprises colored quartz particles distributed therein.

17. The material of claim 15 further comprising a fourth layer overlying the third layer, said fourth layer including a clear aliphatic polymer.

* * * * *